United States Patent [19]
Zeidler

[11] Patent Number: 5,434,758
[45] Date of Patent: Jul. 18, 1995

[54] INDEPENDENT LIGHT REPLACEMENT FOR VEHICLE

[76] Inventor: Reuven Zeidler, 150-15-72nd Rd. Studio-A, Flushing, N.Y. 11367

[21] Appl. No.: 120,064

[22] Filed: Sep. 13, 1993

[51] Int. Cl.⁶ ............................................... B60Q 7/00
[52] U.S. Cl. ..................... 362/80; 362/191; 362/396; 362/397; 362/398; 362/83.3; 340/479; 340/472; 340/473
[58] Field of Search ............ 362/191, 80, 61, 396, 362/397, 398, 233; 340/479, 472, 473

[56] References Cited

U.S. PATENT DOCUMENTS

| | | | |
|---|---|---|---|
| 2,783,367 | 12/1957 | Locke | 362/396 |
| 3,278,741 | 10/1966 | Wood | 362/80 |
| 3,325,639 | 6/1967 | King | 362/297 X |
| 3,460,728 | 8/1969 | Adamson | 362/80 X |
| 3,789,358 | 1/1974 | Ellis | 340/473 |
| 4,058,794 | 11/1977 | Menke | 340/473 |
| 4,776,766 | 10/1988 | Brent | 362/191 X |
| 4,859,982 | 8/1989 | Seaburg | 362/61 X |
| 4,952,910 | 8/1990 | Straten | 340/473 |
| 5,041,813 | 8/1991 | Chang | 340/472 |
| 5,057,815 | 10/1991 | Smoot et al. | 362/61 X |
| 5,126,926 | 6/1992 | Chiang Wen | 362/80 X |

Primary Examiner—Ira S. Lazarus
Assistant Examiner—Thomas M. Sember
Attorney, Agent, or Firm—Judith Adele Plotkin

[57] ABSTRACT

A novel compact and portable lighting system can be used for both mobile and immobile vehicles. The lighting system can act both as auxiliary lighting and as back-up lighting for standard vehicle light systems. This novel system includes an auxiliary portable power source such as a battery and a control box which can be mounted on the inside of a window. The lighting assemblies connected through the control box can include any combination of headlights, brake lights, reverse lights, signal lights, hazard lights or other useful lights. The lighting assemblies connected to the control box can be enabled independently of each other. The frame upon which the lights are mounted is adjustable in size so as to be able to fit any sized vehicle. A preferred means to secure this novel portable lighting system is with magnetic suction cups so that the invention can be secured to both metallic and nonmetallic surfaces. This enables rapid placement and easy removal of the lighting system as desired.

12 Claims, 3 Drawing Sheets

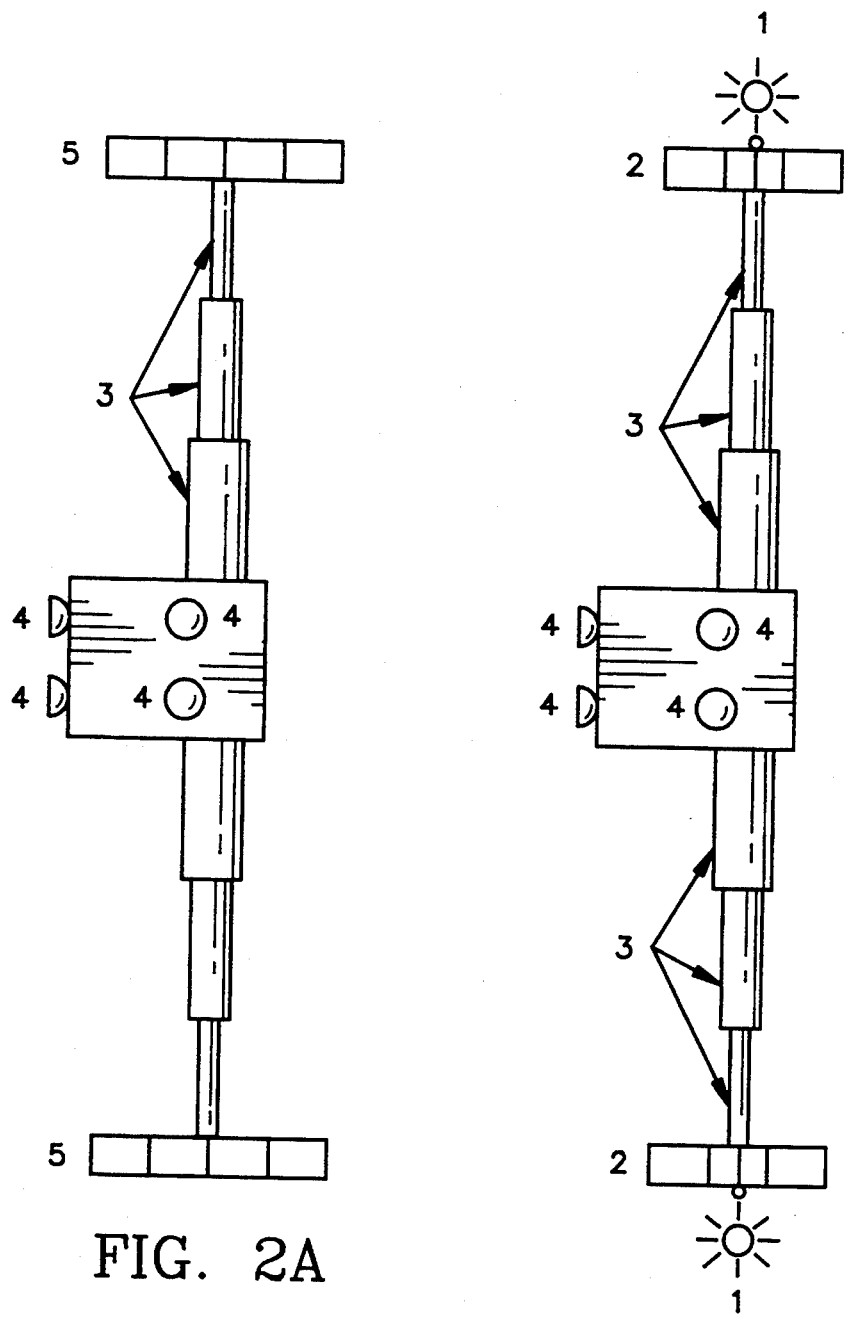
FIG. 2A
FIG. 2B
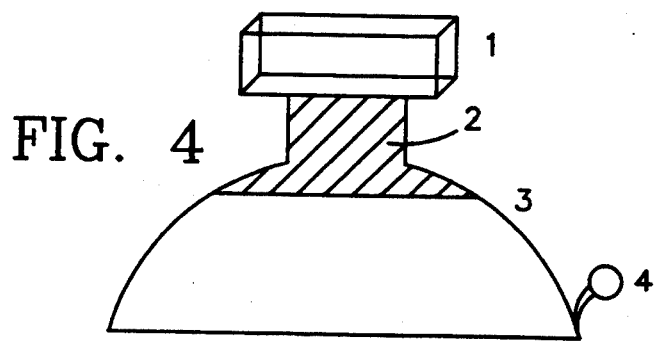
FIG. 4

INDEPENDENT LIGHT REPLACEMENT FOR VEHICLE

BACKGROUND

The present invention relates to a system which provides alternate lighting capabilities for vehicles which are mobile but have lost the operation of one or more lights including headlights, brake lights, hazard lights, and signal lights. This system also provides for warning lights in immobilized vehicles which are standing or being towed regardless of whether the vehicle power source is adequately operational.

The prior art does not describe any combination useful for both of these purposes. In U.S. Pat. No. 4,776,766, Brent describes a portable safety light and air pump combination useful in pumping up spare tires in the presence of adequate lighting. The warning light is not intended to be used on a moving vehicle. Neither is it secured to the vehicle.

Adamson in U.S. Pat. No. 3,460,728, describes the attachment of warning equipment by straps to emergency vehicles. The equipment used is to be in addition to the regular vehicle lighting systems and is not intended to provide alternate lighting should the regular lighting systems fail in part or entirely.

Chiang Weng in U.S. Pat. No. 5,126,926, describes a system that can be used as a brake light or as a hazard warning board, but not both simultaneously. There is no suggestion of mounting this system on the vehicle roof. Neither is there any suggestion to include lights in the system that can be used as back-ups for lights that may fail in the regular vehicle lighting systems.

SUMMARY OF THE INVENTION

It is therefore an object of this invention to provide alternate lighting systems for vehicles should the regular lighting systems fail in part or entirely. These alternate systems do not require an adequately operational vehicle battery as an alternate power source is available for use if needed.

It is another object of this invention to provide for hazard lights for standing vehicles regardless of whether the vehicle power source is operational.

It is a further object of this invention to similarly provide for hazard lights when the vehicle is being towed.

Yet another object of this invention is to provide the alternate and additional lighting in a manner that is swift and easy to set up.

A further object of this invention is to provide an easily accessible control box which can control the alternate lighting systems connected thereto. Each system is enabled independently of the other systems.

The present invention also provides a means to adjustably secure the alternate, back-up lighting systems to the vehicle. This means is rapid and easily reversible when the lights are no longer needed. Hence the same unit of this invention can be fitted to different sized vehicles in a matter of minutes.

Other objects and features of the present invention will be apparent from the following detailed description of the preferred embodiment.

BRIEF DESCRIPTION OF THE FIGURES

FIG. 2 (A-B) depict a light holder assembly to be mounted on a vehicle with telescopic arms to adjust to vehicle size and magnetic suction cups to secure the assembly to a vehicle.

FIG. 4 depicts a magnetic suction cup useful in securing the light holder assembly to a vehicle.

DETAILED DESCRIPTION OF THE PREFERRED EMBODIMENT

Figure 1:
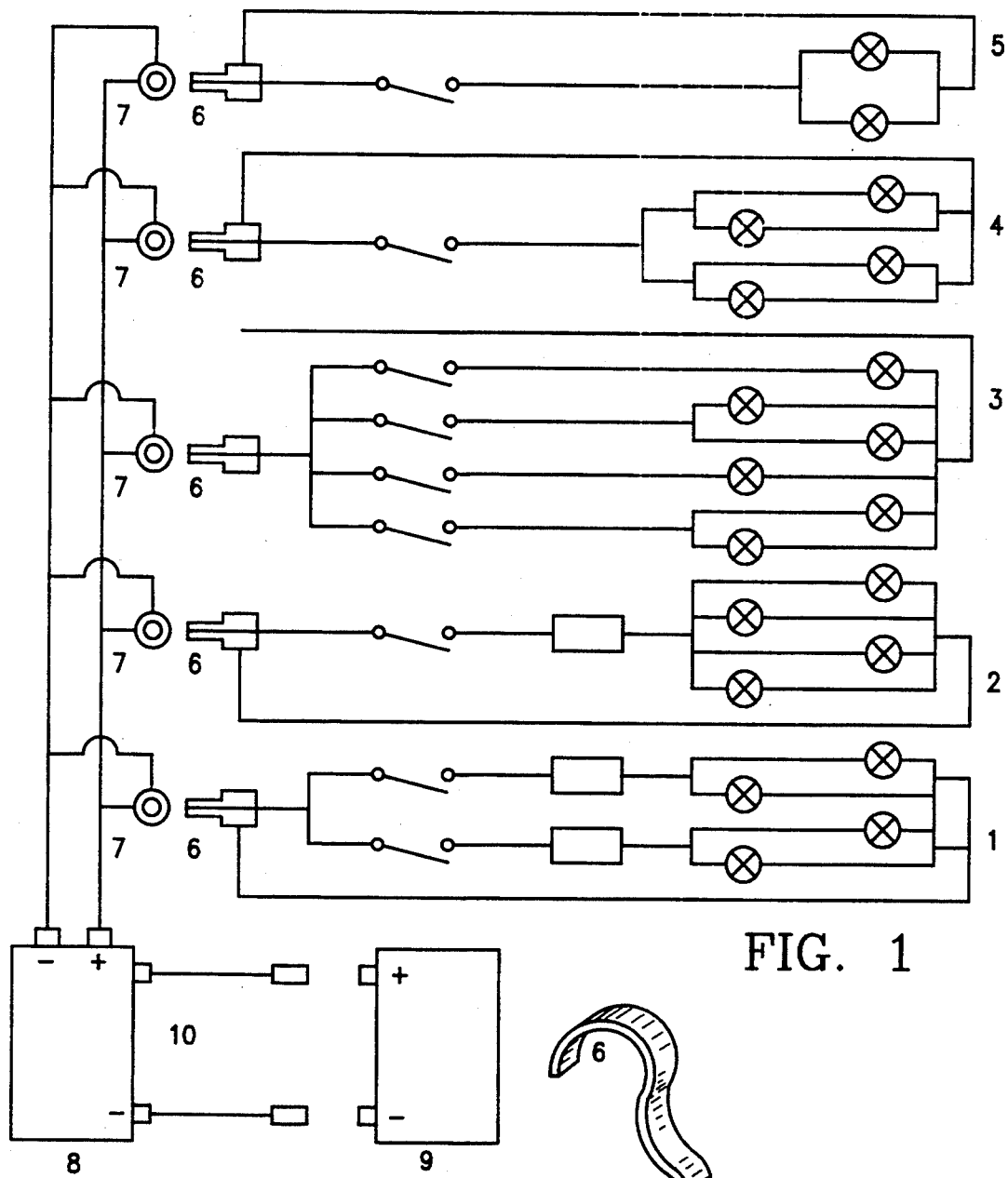
FIG. 1 shows five independent light systems each capable of being reversibly connected to a vehicle power source or, alternatively, to a back-up power source.

FIG. 1 shows alternate, back-up lighting systems useful in both mobile and immobile vehicles. Signal assembly 1 includes flashers, switches, and a means to connect the system to a power source. Hazard light assembly 2 includes a flasher, a switch, and a means to connect to a power source. Night lights are in headlight assembly 3 which also includes independent switches and a means to connect to a power source.

Brake light system 4 includes a means which responds to brake pedal motion as well as a means to connect to a power source. Reverse light assembly 5 also includes a means to connect to a power source and a switch.

In this depiction the means to connect to a power source (6) are insertable into the receiving connectors 7 leading to the power source 8. Power source 8 is a portable back-up power source. If the vehicle battery 9 is to be used, it can be connected to the system with appropriate wiring (10).

All of the switches for enabling the various light systems can be placed in a control box designed for mounting on an easily reachable car window. Hence, if the control box is mounted next to the driver, the driver can turn the needed lights on and off while driving. For instance, as night falls the driver can turn on the headlights without stopping. Similarly, turn signals can be activated and stopped as needed without stopping. This is particularly useful at night when hand signals are not easily seen.

The headlights of system 3 can be oriented as needed. In FIG. 2, knob 1 is used to adjust the axis angle of a holder with mounted light assembly 2. Knob 1 can then be locked at the needed adjustment position. Light holder assembly 5 is mounted on a frame with telescopic arms 3 which can adjust to the size of the vehicle. The frame is secured with magnetic suction cups 4 that can be used on both metallic and nonmetallic surfaces.

The frame holding the lights can be mounted along the roof at any position. For instance, it can be mounted forward for a combination of headlights and signal lights. Alternatively, it could be mounted toward the rear for use as hazard lights while towing. Other combinations of lights can be used and the optimal positioning of the frame decided as the need arises. If needed, two or more frames with different combinations of lights may be connected and positioned in parallel across the roof at varying distances from one another as the situation requires.

Figure 3:
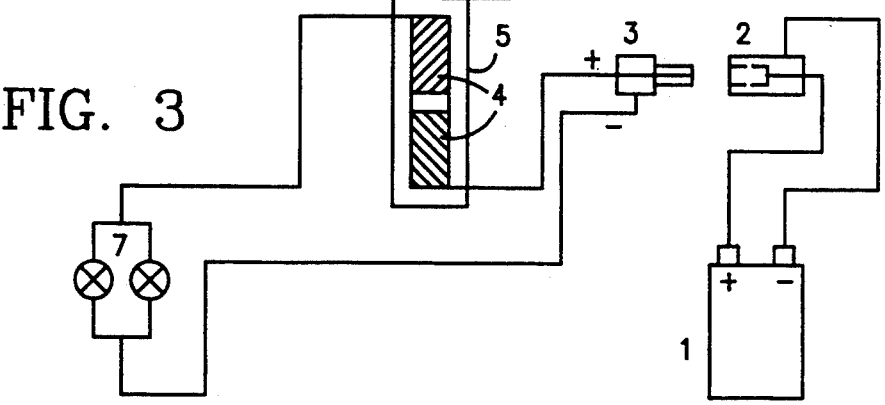
FIG. 3 depicts an auxiliary brake system in greater detail.

FIG. 3 depicts an embodiment of an auxiliary brake system. The system is linked to power source 1 by inserting connector 3 into receiving part 2. Electrical contacts 4 are insulated with flexible dry foam 5. The foam pad containing these pressure responsive contacts 5 is fastened by strap 6 to the brake pedal. Depressing the brake pedal will cause the pressure responsive contacts to be activated, such as by a spring switch. Thus the circuit will be closed and brake lights 7 lit.

FIG. 4 depicts one embodiment of a useful magnetic suction cup. Magnetic handle 1 is attached to magnet 2 at the top of suction cup shell 3. Suction release lever 4 provides for ready removal of the device if needed. This device can be used to reversibly secure the present invention to both metallic and non-metallic roofs.

Figure 5:
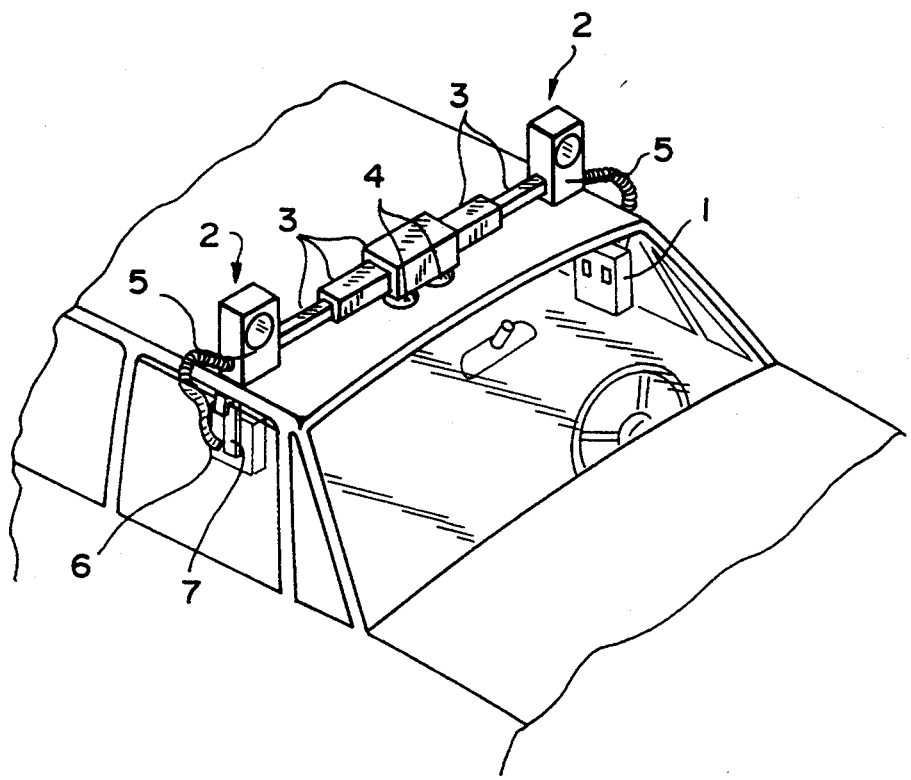
FIG. 5 depicts a light holder assembly mounted on a vehicle roof with two options for a window mounted control box.

FIG. 5 depicts a light holder assembly mounted on a vehicle roof toward the front of the vehicle. Parts 2, 3 and 4 correspond respectively to parts 2, 3, and 4 of FIG. 2. 1 is the control box mounted in the gap of the driver side window which is opened at least enough to allow for the mounting of control box 1. Electrical connections from control box 1 to the light assembly is provided by appropriate wiring, 5. An alternate position for mounting a control box is seen in control box 6 mounted on the passenger side window, 7 provides a means by which control box 6 is mounted on the window. Such a means could be a spring based clamp or a flattened hook-like segment attached to the control box.

Figure 6:
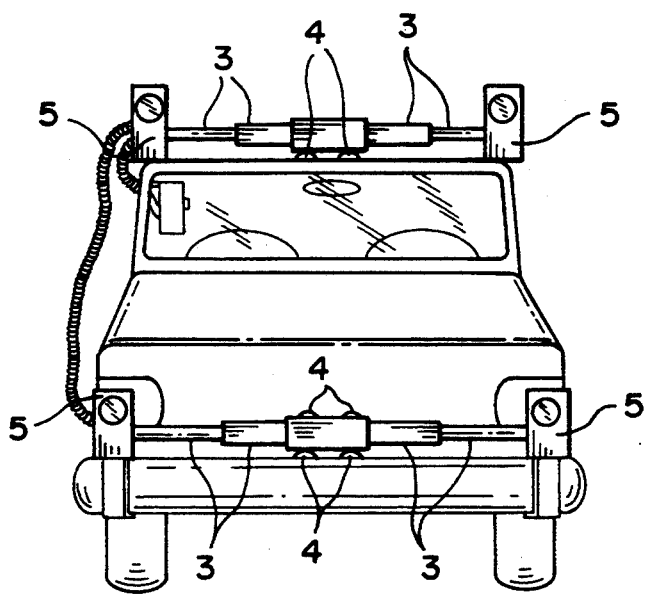
FIG. 6 depicts light holder assemblies mounted towards the rear of a vehicle on the roof and on the bumper.

FIG. 6 depicts light assemblies mounted towards the rear of the car on the roof and on the bumper. Parts 3, 4, and 5 correspond respectively to parts 3, 4, and 5 described in FIG. 2. All suction magnets, 4, depicted in FIG. 2 are in use for the bumper mounting in FIG. 6 via suction magnets 4. These suction magnets 4 secure the light assembly both to the bumper and to the rear of the vehicle body.

The present invention is both compact and portable, easily adjustable to vehicles of different sizes, and useful for both mobile and immobile vehicles in both day and night driving conditions. Since the present invention can be mounted on a car and enabled in a little over a minute, improved night-time safety for emergency situations can be achieved. Similarly, night-time towing is made safer through use of the present invention for rear mounted hazard lights. Additionally, the presence of an auxiliary power source allows for use of the present invention even when the vehicle power source (e.g. battery) is not adequately working or the electrical circuits are malfunctioning.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is

1. A portable lighting system for use on a vehicle comprising:
   a. a frame of adjustable size;
   b. a means to adjust said frame size to the size of the vehicle on which it is to be mounted;
   c. a means to secure said frame to the vehicle;
   d. a control box from which at least two lighting systems can be enabled independently of one another;
   e. a braking light system controlled by pressure on a brake pedal and enabled by a first switch in said control box wherein said braking light system comprises at least one brake light holder containing at least one brake light and mounted on said frame;
   f. a head light system enabled by a second switch in said control box and comprised of at least one headlight holder containing at least one headlight and mounted on said frame wherein the orientation of said at least one headlight is adjustable;
   g. a signal light system enabled by a third switch in said control box and comprised of at least two signal light holders each containing at least one signal light and each mounted on said frame;
   h. a hazard light system enabled by a fourth switch in said control box and comprised of at least one hazard light holder containing at least one hazard light and mounted on said frame;
   i. a reverse light system enabled by a fifth switch in said control box and comprised of at least one reverse light holder containing at least one reverse light and mounted on said frame;
   j. a power source; and
   k. a means to connect at least one of said head light system, said braking light system, said reverse light system, said signal light system, and said hazard light system to said control box and to said power source.

2. A portable lighting system as described in claim 1 wherein said means to adjust said frame size comprises at least one telescopic arm.

3. A portable lighting system as described in claim 1 wherein said means to secure said frame to said vehicle is magnetic.

4. A portable lighting system as described in claim 1 wherein said means to secure said frame to said vehicle uses suction.

5. A portable lighting system as described in claim 1 wherein said means to secure said frame to said vehicle uses at least one magnetic suction cup.

6. A portable lighting system as described in claim 2 wherein said means to secure said frame to said vehicle uses at least one magnetic suction cup.

7. A portable lighting system as described in claim 1 in which said control box is mounted on a window.

8. A portable lighting system as described in claim 2 in which said control box is mounted on a window.

9. A portable lighting system as described in claim 1 in which said power source is the power source of the vehicle.

10. A portable lighting system as described in claim 2 in which said power source is the power source of the vehicle.

11. A portable lighting system as described in claim 1 in which said power source is a portable auxiliary power source.

12. A portable lighting system as described in claim 2 in which said power source is a portable auxiliary power source.

* * * * *